Jan. 17, 1950  J. M. HUSH ET AL  2,494,760
VIBRATOR TYPE MOTOR
Filed May 14, 1948  5 Sheets-Sheet 2
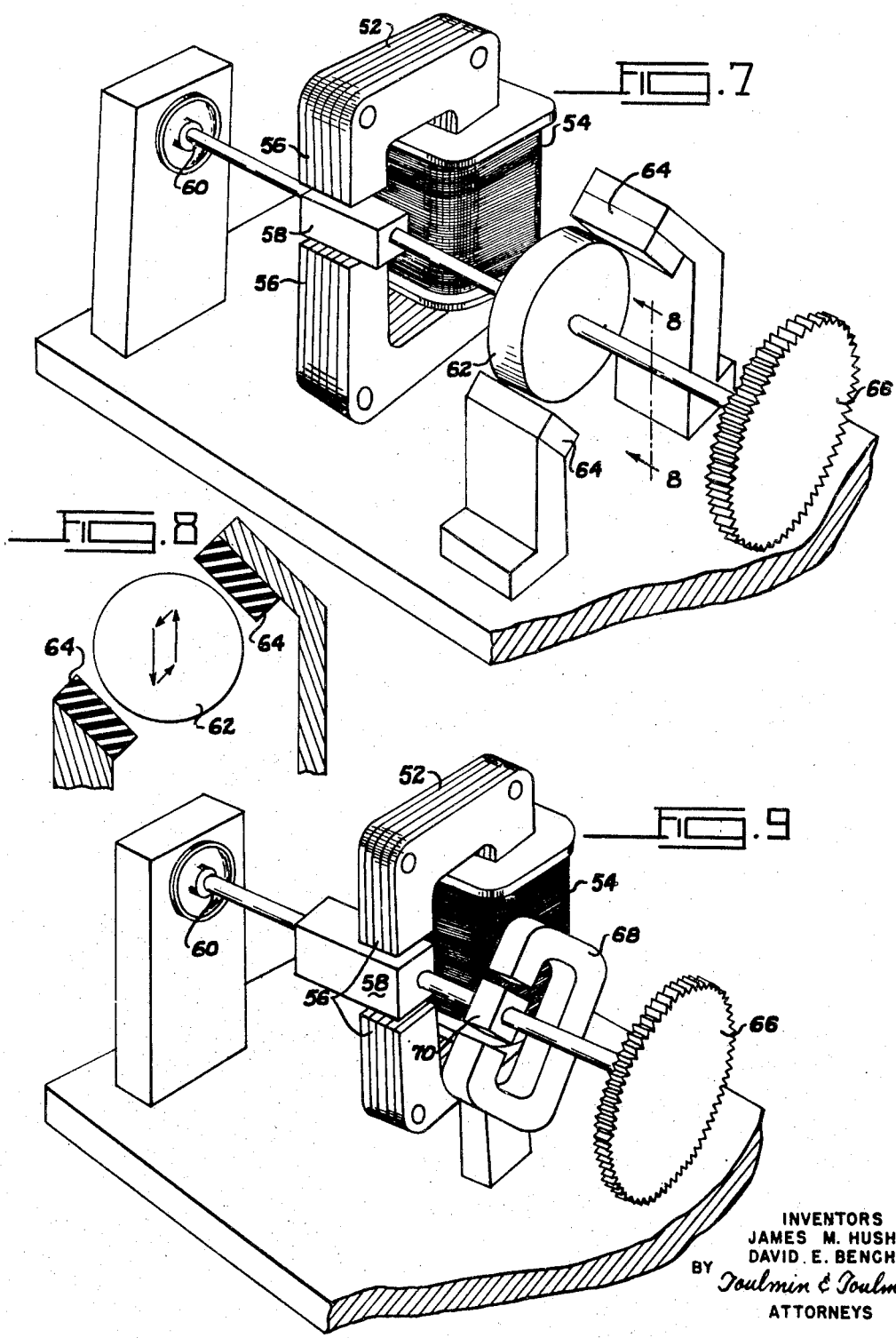
INVENTORS
JAMES M. HUSH
DAVID E. BENCH
BY Toulmin & Toulmin
ATTORNEYS

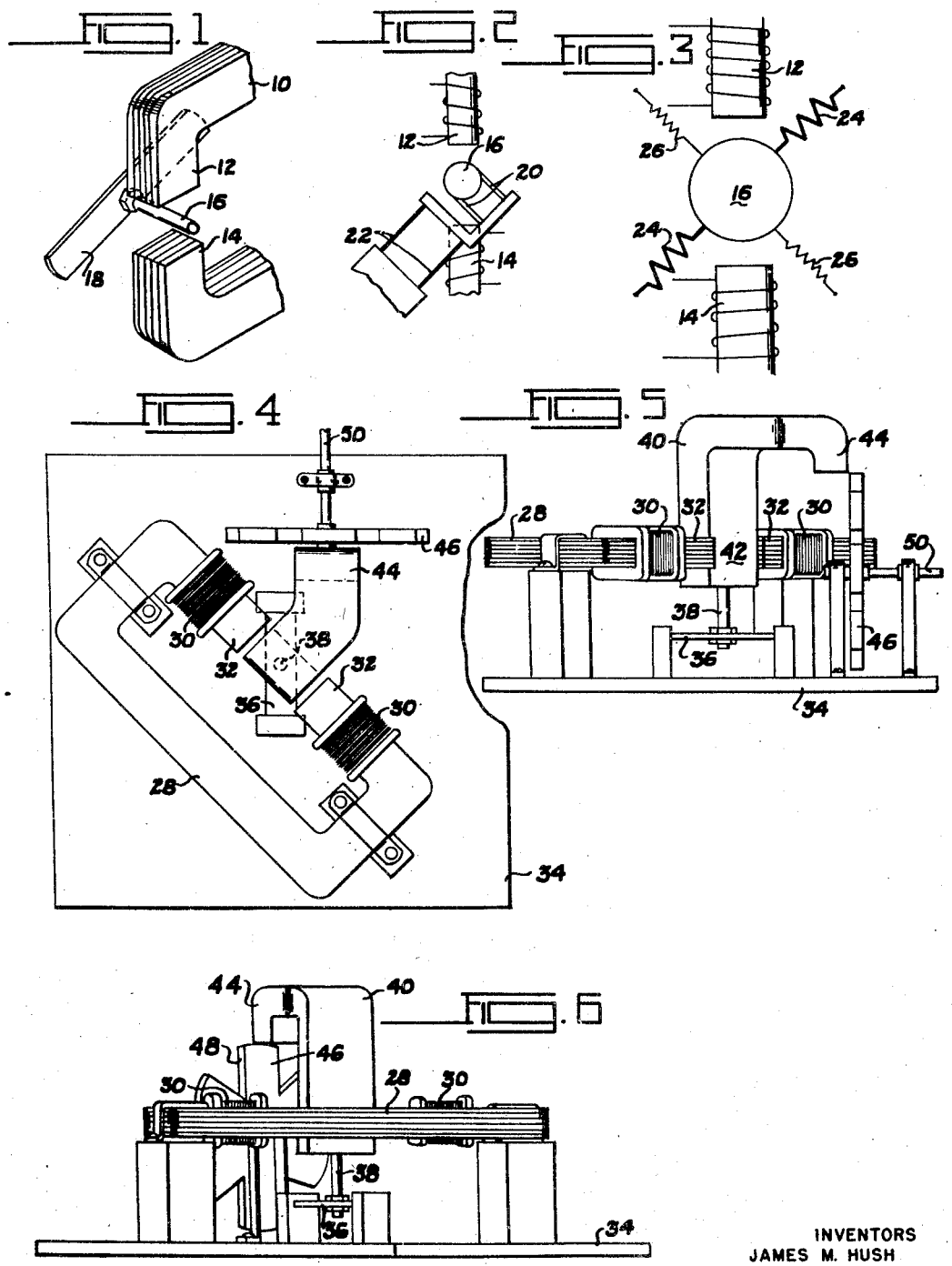

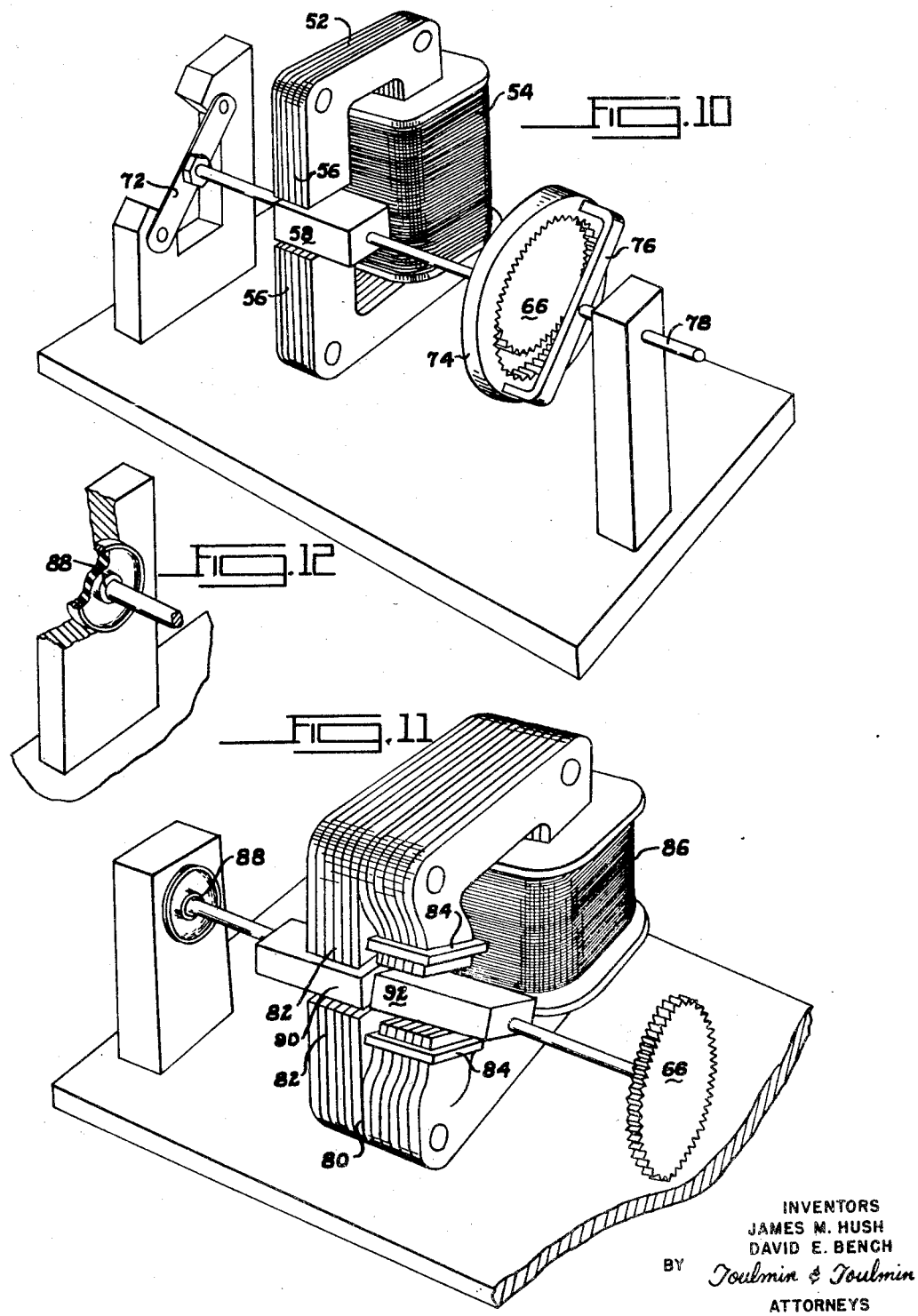

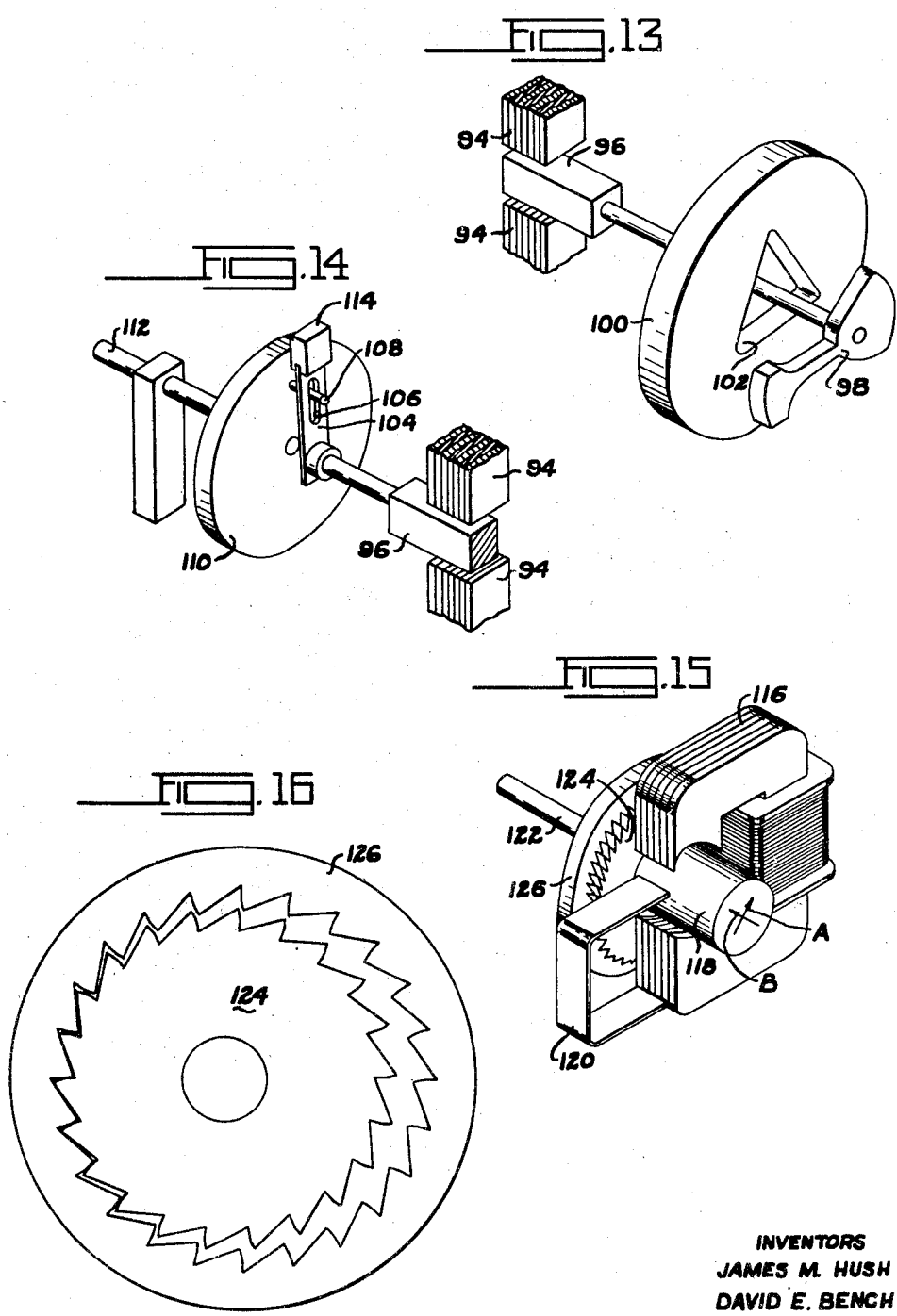

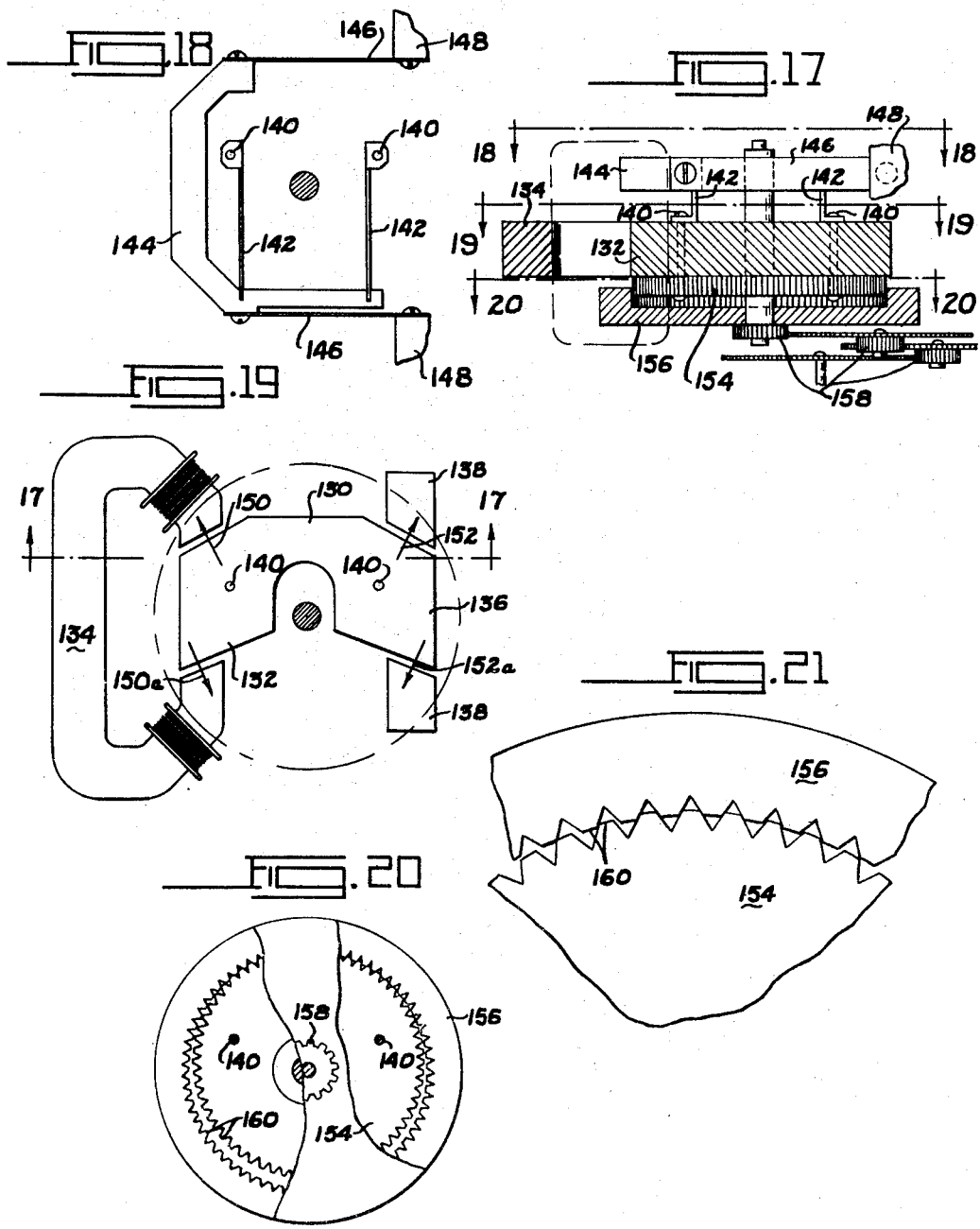

Patented Jan. 17, 1950

2,494,760

UNITED STATES PATENT OFFICE 2,494,760

VIBRATOR TYPE MOTOR

James M. Hush and David E. Bench, Dayton, Ohio, assignors to Hansen Manufacturing Company, Princeton, Ind., a corporation of Indiana Application May 14, 1948, Serial No. 27,036

6 Claims. (Cl. 172—126)

This invention relates to electric motors, and particularly to electric motors wherein the armature moves in a gyratory path.

In connection with the conversion of alternating current power to rotary mechanical motion it is necessary, in order for the said motion to be useful, to at one time effect a radial reduction in speed from the rate at which the alternating current alternates and to deliver a substantial portion of the power absorbed from the electric lines to the rotating element.

The primary object of the present invention is to provide an improved arrangement for accomplishing these purposes.

Still another object is the provision of an electric motor wherein high bearing speeds are eliminated and thus long life of the running parts of the motor enhanced.

A still further object is the provision of a simple arrangement for changing pulsating electric current into rotary mechanical power.

These and other objects and advantages will become more apparent upon reference to the following description taken in connection with the accompanying drawings in which:

Figures 1, 2 and 3 are diagrammatic views showing different manners of obtaining gyratory or bodily rotary movement of a member by means of a pulsating or alternating magnetic field;

Figures 4, 5 and 6 are views of a motor adapted for utilizing one of the principles shown in Figures 1, 2 and 3;

Figure 7 is a perspective view of another form of electric motor having a gyratory armature;

Figure 8 is a view indicated by the line 8—8 on Figure 7;

Figure 9 is a view similar to Figure 7, but showing still another way of effecting gyratory movement of the armature;

Figure 10 is a view similar to Figures 7 and 9, but showing a spring support for the gyratory armature similar to that shown in Figures 4, 5 and 6;

Figure 11 is a view similar to Figure 10, but showing the use of shaded poles for causing gyratory movement of the armature;

Figure 12 is a small detail view showing the resilient support for the armature and the motor of Figure 11;

Figures 13 and 14 show still other ways of transmitting the vibrating motion of the armature into rotary motion and characterized by a rotating member carried by the armature;

Figure 15 shows another embodiment of the principles of this invention;

Figure 16 is a somewhat enlarged view showing the gear arrangement connecting the gyratory armature of Figure 15 with the rotary output shaft;

Figure 17 is a sectional view indicated by the line 17—17 on Figure 19 and showing one form which the motor of this invention can take;

Figure 18 is a plan view looking down on top of the motor of Figure 17 as indicated by the line 18—18 thereon and showing the resilient support of the gyratory parts of the motor;

Figure 19 is a similar view taken on the line 19—19 of Figure 17 and showing the gyratory parts of the motor and the magnetic field structure associated therewith;

Figure 20 is a view indicated by the line 20—20 in Figure 17 and shows the gearing interconnecting the gyratory and rotary members of the motor; and Figure 21 is an enlarged view showing the gear tooth arrangement.

Referring to the drawings, and particularly to Figure 1, there is shown a magnetic frame 10 having the spaced poles 12 and 14. It will be apparent that the excitation of the magnetic frame 10 by pulsating or alternating magnetomotive force will set up a corresponding pulsating or alternating magnetomotive force between the poles 12 and 14. In the space between the poles is a polarized armature 16. The purpose of polarizing the armature is that it will have a definite thrust thereon in one direction or the other depending on the direction of the magnetomotive force between the poles 12 and 14.

The armature 16 is resiliently supported by a spring member 18 which extends diagonally relative to the principal magnetic axis between the poles 12 and 14. This spring member is preferably a flat strip and is stiff against deflection in the plane of its length but is relatively feeble against deflection in a plane transverse to its length.

By arranging this spring at substantially 45 degrees to the aforementioned magnetic axis, the armature 16 is caused to take a gyratory or orbital movement upon excitation of the magnetic field. This is due to the fact that when the armature is acted on to move toward one of the poles it takes a motion which is at an angle to the said magnetic axis.

As oscillations or gyrations of the armature continue it tends to move in a gyratory path so that the length of the armature defines a cone. The outer end of the armature, that is the end remote from its connection with the spring 18, thus follows a circular path, but due to its connection with the spring there is no rotation of the said armature.

Figure 2 shows a similar arrangement and wherein similar parts bear similar numbers, but the spring support for the armature 16 in Figure 2 comprises the stiff springs 20 which extend in one direction at 45 degrees to the magnetic axis between the poles 12 and 14 and the relatively feeble springs 22 which support the stiff springs and armature and extend at 90 degrees to the stiff springs.

As in the case of the arrangement shown in Figure 1 the armature 16 will have a compound movement which, when conditions become stable, will result in a gyratory movement of the said armature.

Figure 3 shows still another arrangement and it will be apparent that the armature 16 in Figure 3 is also acted on by stiff springs 24 and feeble springs 26. It will also be apparent that the armature 16 in Figure 3 will have a gyratory or orbital motion after conditions determining its path have become stable.

Modification of Figures 4 through 6

Figures 4, 5 and 6 show one practical application of the means disclosed in Figures 1 through 3 for bringing about orbital motion of an armature by means of a pulsating or alternating magnetic field.

In Figures 4 through 6 there is a magnetic frame 28 which is of magnetic material and which may, in fact, be magnetized. If the frame is not magnetized then the coils 30, when supplied with an alternating current, will produce an alternating magnetic field between the poles 32. If the frame is magnetized then an alternating current supplied to the coils 30 will produce a pulsating field between the poles.

Mounted on the base 34 which supports the magnetic frame there is a leaf spring member 36 which extends at an angle of 45 degrees to the magnetic axis between the poles. Secured to the spring 36 is an armature 38 which includes a magnetic part 40 having one pole at 42 disposed directly between the poles 32, thus to be acted on thereby, and a second pole 44.

As in the case of the arrangement shown and described in Figure 1, excitation of the magnetic frame with an alternating or pulsating magnetomotive force, will result in gyratory or orbital movement of the armature 38. This is utilized to produce rotary motion by rotatably mounting a rotor 46 in a position such that the pole 44 will sweep closely adjacent the periphery during a part of the orbital movement of the armature 38.

Since the pole 44 has one polarity the rotor 46 is arranged to have spaced areas of the opposite polarity about its periphery. This is accomplished by toothing or serrating the periphery of the rotor as indicated at 48 and polarizing the teeth or serrations so that the outermost parts thereof all have the same polarity and opposite to that of the pole 44.

In operation, the device acts as a ratchet and each time the pole 44 sweeps across the periphery of the rotor 46 it advances it one tooth. After all conditions contributing to rotational movement of the rotor 46 have become stabilized, the output shaft 50 on which the rotor is formed will have uniform rotational movement.

Modification of Figures 7 and 8

In Figures 7 and 8 there is shown still another means of producing gyratory or orbital movement of an armature by a pulsating magnetic field. In Figure 7 there is the magnetic structure 52 adapted for excitation by the coil 54. Between the poles 56 of the magnetic structure there is the polarized armature 58. The armature 58 has one end supported as at 60 in a resilient rubber-like grommet member which is shown in section in Figure 12. On the opposite side of the magnetic structure from the resilient support 60 the armature carries a bumper block 62 which is adapted for engagement with the diagonally arranged bumpers 64 which are positioned to engage the said bumper block near the limits of its vibrating movement in each direction.

The action of the bumper block and the bumpers 64 is best seen in Figure 8. In Figure 8 it will be noted that each of the bumpers strikes and deflects the bumper block and, therefore, the armature in one direction so that the armature tends to take a gyratory or open orbital path as it is vibrated due to excitation of the magnetic field structure 52.

As will be seen hereinafter, there may be a gear 66 mounted on the end of the armature and which gear is utilized for the purpose of driving a rotary member in response to the gyratory or orbital movements of the armature of the motor.

Modification of Figure 9

In Figure 9 the arrangement shown is substantially identical with that shown in Figure 7 and, accordingly, similar parts are similarly numbered. In Figure 9, however, the bumper block 62 and bumpers 64 have been eliminated and instead there is a C-shaped permanent magnet 68 arranged with the magnetic axis between its poles at an angle of substantially 45 degrees to the magnetic axis of the poles 56, so that as the armature vibrates due to excitation of the field structure 52, the auxiliary armature 70 is acted on by the permanent magnet 68 to exert a lateral bias on the main armature.

It will be apparent that as the principal armature 58 moves upwardly the bias exerted by the permanent magnet 68 will be rightwardly thereon and that as the principal armature moves downwardly the bias exerted thereon by the permanent magnet 68 is leftwardly. This results, as in the case of the previous modification, in the description of a gyratory or orbital path by the free end of the armature.

Modification of Figure 10

Figure 10 shows an arrangement similar to that illustrated in Figures 7 and 9 and, accordingly, the main magnetic frame and armature bear corresponding numbers. In Figure 10, however, the resilient support for the armature is a diagonally arranged leaf spring 72 similar to that illustrated in Figures 1 and 4 through 6. This spring operates in the same manner as that described in Figures 1 and 4 through 6 and results in causing the armature to take an orbital or gyratory path.

As in the case of the modification of Figures 7 and 9, the armature carries a gear 66 at its free end. This gear 66 is disposed internally of an internal gear 74 and which internal gear is mounted on a bracket 76 carried by the shaft 78. As the armature of the motor describes its orbital path the limits of the said path are determined by the engagement of the internal gear 74 by the gear 76 on the said armature.

Due to the fact that the gear 66 is fixed on the armature and cannot rotate, the said orbital movement of the armature and gear will produce rotary movement of the gear 74. For the purpose of predetermining the exact speed of rotation of the gear 74 it is preferably toothed and bears a predetermined ratio to the gear 66.

As an example, assuming that the coil 54 is energized by alternating current at a frequency of 60 cycles per second, the armature 58 and gear 66 will gyrate, or make one complete rotation about their orbital path in 1/60 of a second. This gives 3,600 complete rotations about the orbital path in one minute.

Assuming that the internal gear 74 has 60 teeth thereon and the gear 66 has 59 teeth thereon, then the drive ratio between the gear 66 and the gear 74 will be 60 to 1. The shaft 78 will thus be driven at 60 revolutions per minute. It will be evident that this speed is readily useful for driving clocks, timers, and the like.

*Modification of Figure 11*

In Figure 11 there is an arrangement shown wherein a magnetic field structure 80 is arranged so that its poles 82 are each divided into parts and on one part of each there is a shading coil 84 which may consist of a single turn of relatively heavy conductor. The magnetic field structure 80 is adapted for excitation by a coil 86.

In the manner already well known in the electric motor art the shading coils 84 cause the magnetic field through the portion of the poles which they enclose to lag behind the magnetic field established in the parts of the poles which are not enclosed by the shading coils. This is utilized, according to this invention, for producing gyratory or orbital movement of the armature in the following manner:

The armature, as before, is resiliently supported at 88 on a rubber-like grommet device such as is shown in Figure 12, and has a polarized port 90 notched between the unshaded parts of the poles 82. A second polarized part 92 of the armature is positioned between the shaded parts of the poles 82. The part 92 of the said shaded poles are arranged at an angle, say, 45 degrees to the magnetic axis between the unshaded pole parts and thus, as the part 90 is vibrated by the unshaded pole parts the said shaded parts will exert a thrust on the polarized part 92 which has a component part transverse to the direction of said vibration.

As in the case of the arrangements discussed in connection with the foregoing modifications for producing gyratory or orbital movement of the armature, the effect of the shaded and inclined pole parts in Figure 11 is to bring about orbital movement of the armature. This orbital movement may be utilized to produce rotary movement as shown in Figure 10.

*Modification of Figures 13 and 14*

In Figures 13 and 14 a somewhat different arrangement is shown for producing rotary movement by means of a vibratory armature. In these figures the poles of the pulsating or alternating magnetic field structure are indicated at 94 and the polarized armature therebetween is indicated at 96. This armature is caused to take an orbital or gyratory path in any of the manners described in connection with the foregoing figures.

In the case of the arrangement shown in Figure 13 the free end of the armature pivotally supports a member 98 which is preferably statically balanced but dynamically unbalanced relative to its pivot axis. Because of the static balance the member 98 will be driven in a rotary path when the armature 96 commences it gyratory or orbital movement. Also, due to the dynamic unbalance of the member 98 it will bring about a larger radius of movement at the free end of the armature than otherwise would be had. This is utilized for producing rotary motion by mounting the flywheel or ring 100 about the armature and forming in the ring or flywheel the triangular aperture 102.

In operation, when the armature assumes an orbital path of sufficient size that it reaches one of the corners of the triangle cutout 102, the said ring or flywheel will commence to rotate synchronously with the orbital travel of the armature. It will be apparent that the rate of rotation of the ring 100 is much higher than any of the output shafts of the previously discussed motors, being 3,600 revolutions per minute for an excitation frequency of 60 cycles per second.

The arrangement illustrated in Figure 14 is similar to that shown in Figure 13 except that pivotally mounted on the end of the armature 96 is a bar 104 having a slot 106 into which extends a pin 108 carried on the flywheel 110. The flywheel 110 is mounted on the output shaft 112 and rotates therewith. The outer end of the bar 104 carries a weight 114 and the effect of the said weight is to bring about rotary movement of the bar 104 about its pivotal connection with the armature 96. After the motor has been energized and has run for a short period of time, the bar 104 will swing about the armature in synchronism with the orbital movement of the armature and drive the member 110 at the same rate of speed. The member 110 and the output shaft 112 thus operate at 3,600 revolutions per minute for an energizing frequency of 60 cycles per second, as in the case of the modification shown in Figure 13.

*Modification of Figures 15 and 16*

In the arrangement shown in Figures 15 and 16, the magnetic frame is indicated at 116 and mounted between the poles thereof is the polarized armature 118 which is supported by the leaf spring 120. The leaf spring is stiff against movement of the armature in the direction indicated by the arrow A, but is relatively feeble against deflection of the armature in the direction indicated by the arrow B. As in the case of the previous modification, this results in orbital or gyratory movement of the armature when the field is energized.

The output shaft of the motor is indicated at 122 and mounted thereon is an internal gear 124 which surrounds an external gear 126 mounted directly on the armature 118. An enlarged view of the gearing arrangement is shown in Figure 16 wherein it will be evident that the orbital movement of the external gear 126 will result in rotary movement of the gear 124.

In the gearing arrangement shown the internal gear has 24 teeth while the external gear has 22. This results in a drive ratio therebetween of 24 minus 22, divided by 24, or 1 to 12. For a gyratory speed of the internal gear of 3,600 revolutions per minute the output shaft 122 will thus be driven at a speed of 300 revolutions per minute.

Modification of Figures 17 through 19

In Figures 17 through 19 there is shown an arrangement embodying the principles of this invention and wherein the physical size of the motor has been reduced to approximately the size of a small clock motor.

In these figures the armature is indicated at 130 and this is a polarized member having one pole at 132 between the two poles of an electromagnetic frame 134 and also having another pole 136 between the soft iron members 138.

It will be noted that the ends of the armature between the pole faces and the soft elements 138 are inclined at an angle to each other. As will be seen hereinafter this is utilized for producing gyratory or orbital motion of the said armature.

The armature is suspended, by means of the pins or bolts 140, from a spring system shown in Figure 18 and which consists of a first pair of leaf springs 142 which have one end connected with the armature by the bolts 140 and their other ends fastened to a yoke 144. The yoke 144, in turn, is supported by the leaf spring 146 to the stationary frame of the motor indicated at 148. It will be evident that the spring and yoke arrangement provides for freedom of movement of the armature 130 in two different directions.

To obtain the said orbital movement the electromagnetic frame 134 is energized with alternating current. Assuming that the instantaneous excitation of the magnetic frame is such that the pole 132 will be attracted upwardly toward the upper of the poles of the electromagnetic frame, this attraction will be in the direction of the arrow indicated at 150 in Figure 19. The movement of the armature in this direction will bring the pole 136 thereof closer to the soft iron member 138, so that another thrust, having the direction indicated by the arrow 152, will be exerted on the armature. It will be apparent that this will produce a compound movement of the armature which, when duplicated in the opposite direction and on the other half cycle of excitation of the magnetic frame 134, will result in gyratory or orbital movement of the armature. The thrusts which obtain during the said other half cycle of excitation of the magnetic frame 134 are indicated at 150a and 152a.

The armature 130 carries on its lower face the gear 154 which meshes with the internal gear 156 when the said armature is following its gyratory path. The said internal gear may be connected by a gear train indicated at 158 with any suitable work member to be driven, such as a clockwork or timer mechanism.

The preferred form of the gear teeth on the gears 154 and 156 is better shown in Figures 20 and 21, wherein it will be noted that the said gear teeth are more or less in the form of a sharp V, except that the teeth on each of the gears are truncated as at 160. This truncation of the gear teeth prevents interference between the tips thereof and permits the armature 130 to gyrate in a relatively small path and still maintain the effective driving relationship. It will be apparent that the number of teeth on the gears is subject to variation and that the particular gear ratio shown is only exemplary.

It will be understood that this invention is susceptible to modification in order to adapt it to different usages and conditions and, accordingly, it is desired to comprehend such modifications within this invention as may fall within the scope of the appended claims.

We claim:

1. In an electric motor; a C-shaped magnetic frame and a coil thereon to establish a pulsating magnetomotive force between the poles of the frame, a polarized armature having one pole thereof between the poles of said frame, soft iron members adjacent the other pole of said armature, and resilient means supporting said armature for movement thereof in its plane but preventing rotational movement of the armature.

2. In an electric motor; a C-shaped magnetic frame and a coil thereon to establish a pulsating magnetomotive force between the poles of the frame, a polarized armature having one pole thereof between the poles of said frame, soft iron members adjacent the other pole of said armature, and resilient means supporting said armature for movement thereof in its plane but preventing rotational movement of the armature, the poles of said armature having surfaces inclined at an angle to each other, and the surfaces of the poles of the magnetic frame and the surfaces of the said soft iron members being substantially parallel thereto.

3. In an electric motor; a bracket, a pair of leaf springs extending from said bracket, a yoke between the free ends of said springs, other springs extending from said yoke at right angles to the first mentioned springs, an armature supported on the free ends of said other springs and being polarized, electromagnetic means at one end of said armature for urging it at an angle to both sets of leaf springs, and soft iron members adjacent the other end of the armature and responsive to the aforementioned movement of said armature for urging it in a different direction whereby the said armature takes a gyratory or orbital path.

4. In an electric motor; a bracket, a pair of leaf springs extending from said bracket, a yoke between the free ends of said springs, other springs extending from said yoke at right angles to the first mentioned springs, an armature supported on the free ends of said other springs and being polarized, electromagnetic means at one end of said armature for urging it at an angle to both sets of leaf springs, soft iron members adjacent the other end of the armature and responsive to the aforementioned movement of said armature for urging it in a different direction whereby the said armature takes a gyratory or orbital path, and gearing carried by said bracket and frame for converting the gyratory motion of said armature into rotary motion of a drive member.

5. In an electric motor; an armature resiliently supported for gyratory movement in its plane but prevented from rotary movement, there being parts of said armature spaced in its plane of different polarity, means for establishing pulsating magnetomotive force across one of the polarized parts of said armature to set up vibratory movement of the armature in one direction and magnetic means adjacent the other polarized part of the armature for setting up thrusts thereon lateral to said direction of vibration in response to the said vibratory movement of said armature, the adjacent faces of said magnetic means and said armature being substantially parallel and inclined at an angle to the said direction of vibratory movement of said armature.

6. In an electric motor; an armature resiliently supported for gyratory movement in its own plane but prevented from rotary movement, spaced parts of said armature in its plane being of opposite polarity, electromagnetic means adjacent one of said polarized parts for establishing a pulsating magnetomotive force thereacross to set up vibratory movement of said armature in one direction, and magnetic means adjacent the other polarized part of the armature for setting up thrusts thereon lateral to said direction of vibratory movement of said armature and in response to the said vibratory movement, the faces of said electromagnetic means and said magnetic means being inclined at an angle to each other and to the said direction of vibratory movement of said armature, and the faces of said armature adjacent the said faces of said electromagnetic means and said magnetic means being parallel thereto.

JAMES M. HUSH.
DAVID E. BENCH.

REFERENCES CITED

The following references are of record in the file of this patent:

UNITED STATES PATENTS

| Number | Name | Date |
|---|---|---|
| 1,862,356 | Warren | June 7, 1932 |
| 2,036,917 | Favre-Bulle | Apr. 7, 1936 |
| 2,437,904 | Adams et al. | Mar. 16, 1948 |